United States Patent
Portman et al.

[11] Patent Number: 5,910,814
[45] Date of Patent: Jun. 8, 1999

[54] INTERFACE FOR LIQUID CRYSTAL DISPLAY RETRACT DEVICE

[75] Inventors: John Portman, Anahiem; Loi Ninh, Foothill; Garry Tillyer, Mission Viejo; Gerald Lester, Costa Mesa; John Newman, Mission Viejo, all of Calif.

[73] Assignees: Sony Corporation, Tokyo, Japan; Sony Transcom, Inc., Irvine, Calif.

[21] Appl. No.: 08/625,472

[22] Filed: Mar. 29, 1996

[51] Int. Cl.⁶ .................................................. H04N 7/08
[52] U.S. Cl. .................................. 348/8; 455/3.3
[58] Field of Search ..................... 348/6, 7, 8, 9, 348/10, 12; 855/3.1, 3.3, 4.1, 4.2; 381/29, 77, 31

[56] References Cited

U.S. PATENT DOCUMENTS

| | | | |
|---|---|---|---|
| 5,177,616 | 1/1993 | Riday | 348/8 X |
| 5,568,484 | 10/1996 | Margis | 370/85.5 |
| 5,596,647 | 1/1997 | Wakai et al. | 381/77 |
| 5,617,331 | 4/1997 | Wakai et al. | 455/3.1 |

*Primary Examiner*—Nathan Flynn
*Attorney, Agent, or Firm*—Jaime A. Siegel; Jerry A. Miller

[57] ABSTRACT

An in-flight entertainment system includes several liquid crystal display (LCD) retract units mountable in a passenger service unit of aircraft. Each of the LCD retract units includes an input connector and an output connector arranged such that signals provided to the input connector appear at the output connector. A system control unit (SCU) is also provided. The SCU is configurable to provide video, power and control signals independently to the input connector of each of the LCD retract units and is also configurable to provide video, power and control signals to the input connector of only a first of the LCD retract units. In the second configuration, the input and output connectors of successive LCD retract units are connected in a daisy chain fashion such that the same signals are provided to each of the LCD retract units. In another aspect of the present invention, each of the plurality of LCD retract units includes status communications bus electronics such as RS-485.

5 Claims, 6 Drawing Sheets

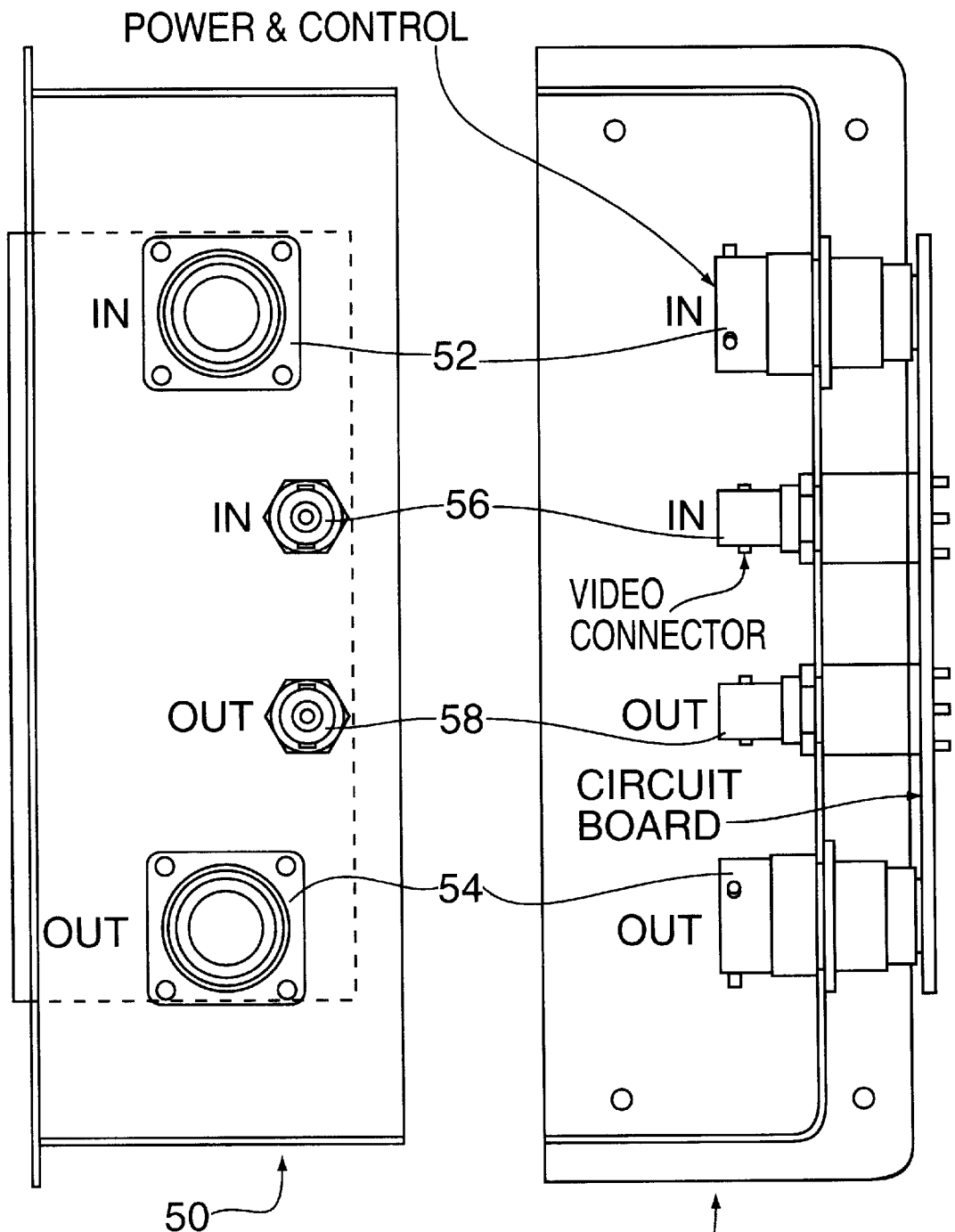

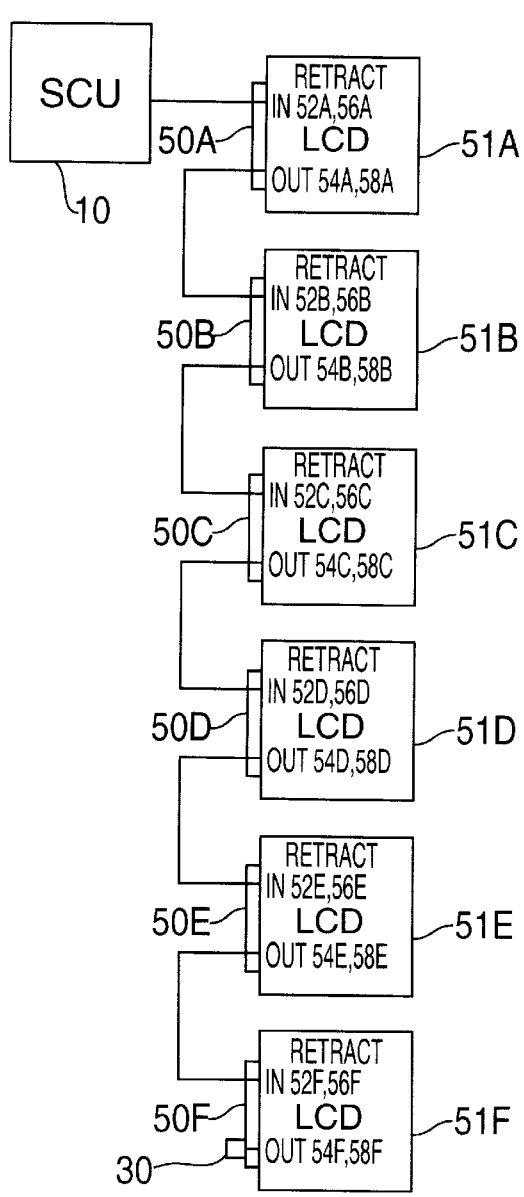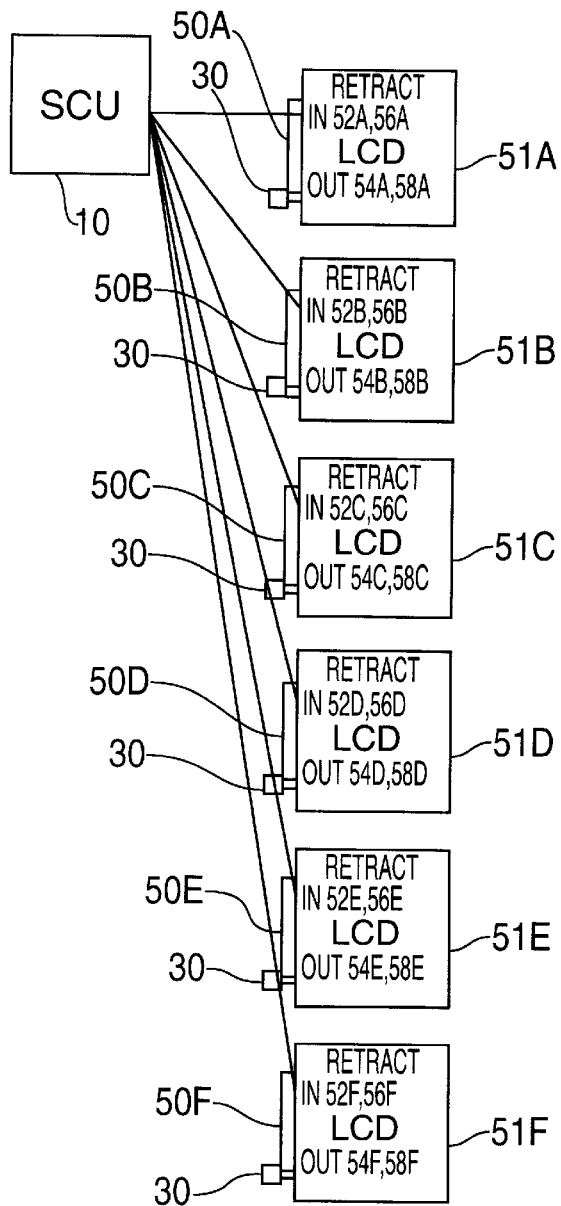
FIG. 6
FIG. 7

INTERFACE FOR LIQUID CRYSTAL DISPLAY RETRACT DEVICE

BACKGROUND OF THE INVENTION

1. Field of the Invention

The present invention relates to an interface for a liquid crystal display (LCD) retract device for an aircraft.

2. Description of Related Art

To provide added comfort to the passengers of an aircraft, it was realized that the aircraft could be provided with television monitors that display movies and other programming during a flight. As a result, several years ago airlines started installing video entertainment systems in the form of ceiling mounted cathode ray tube (CRT) monitors. These CRT monitors were either stationary, manually deployable or electrically deployable. A system control unit (SCU) was typically used to send information signals such as video to one of the CRTs. More specifically, the SCU would receive a video signal from a VCR and send the video signal to one of the several CRTs on an aircraft. Additionally, the SCU would also provide power and control signals to the one CRT. By daisy chaining the other CRTs together with the one CRT receiving the signals from the SCU, the same signals from the SCU (video and power and control) could be provided to all of the CRTs. FIG. 1 shows an exemplary daisy chain arrangement wherein an SCU 10 sends video and power and control signals to an input of a first CRT 20A. An output of the first CRT 20A in turn outputs the video and power and control signals to an input of a second CRT 20B; an output of the second CRT 20B in turn outputs the video and power and control signals to an input of a third CRT 20C, etc. This process continues until the last CRT in the chain, in this case CRT 20F, is reached. A terminator 30 is typically connected to the output of the last CRT 20F in the chain for purposes of impedance matching.

As is also known, in the airline industry the seating in an aircraft is divided into zones. Typically, these zones are defined as first class, business class and tourist class, or zones one through five and upper-deck. When a daisy chain CRT arrangement of the type described above in connection with FIG. 1 is employed, the CRTs are controlled without respect to the different zones on a particular aircraft. For example, the same movie would be sent to all of the CRTs on a particular aircraft at the same time. As the airlines and their customers desired more sophisticated in-flight entertainment, the CRT monitors became controllable by zones. Such control would typically be accomplished by providing a SCU that is capable of controlling multiple zones and only daisy chaining together the CRTs of a particular zone. As a result, one type of programming could be shown, for example, in first class and a different type of programming shown in tourist class. However, such an added degree of versatility was still not sufficient for the airlines, and this lead to the advent of the smart video distribution unit (SVDU).

SVDU's contain communication bus electronics, e.g., RS-485, and are connected between an SCU and one or more CRTs. SVDU's receive the video and power and control signals form SCU's, interpret these signals, and provide for the control of any single CRT or group of CRTs in response thereto. For example, as shown in FIG. 2, in a given zone of an aircraft there may be three SVDU's 40A–C, each for controlling two CRTs. In this case, SVDU 40A controls CRTs 50A and B, SVDU 40B controls CRTs 50C and D and SVDU 40C controls CRTs 50E and 50F. The SVDUs 40A–C receive information (video and control and power) from the SCU 10 and distribute the information directly to their associated CRTs, i.e., there is no daisy chaining and thus it is not necessary to provide outputs form the CRTs 50A–F. As a result, each group of two CRTs, e.g., 50A and B, can be independently controlled. The SVDUs 40A–C are also arranged to track the status of their respective CRTs. In an even more sophisticated arrangement there may be one SVDU associated with each CRT, providing even more control flexibility.

Typically, SVDUs are mounted between the wall panel and the fuselage of an aircraft. As such, the wall panels of the aircraft must be removed in order to install or service the SVDU's. This is a relatively time consuming process and it would be desirable to carry-out such operations without removing aircraft wall panels.

As the video distribution systems became even more sophisticated, liquid crystal display (LCD) retract devices began to replace conventional CRTs due to their performance and light weight. U.S. Pat. No. 5,096,271 describes such an LCD retract device that is mountable in the passenger service unit of an aircraft: These LCD retract devices are typically coupled with multiple SVDUs (up to one SVDU per LCD) to provide the pinnacle in in-flight entertainment, but at a substantial expense. Furthermore, since these LCD devices have typically been associated with high-end, in-flight entertainment, the daisy-chaining technique of the type described above with respect to CRT monitors has not been employed. As a result, because of their expense, these sophisticated in-flight entertainment systems were in the past found only on wide-body aircraft.

It has presently become desirable to bring more sophisticated entertainment systems typically found only in wide-body aircraft to narrow-body aircraft as a way to generate additional revenue for the airlines while at the same time maintaining versatility of the simpler systems traditionally found in narrow-body aircraft. I would also be desirable to eliminate SVDU's and their complicated installation and maintenance procedures.

Therefore, it is an object of the present invention to provide an interface for an LCD retract device that provides the sophisticated in-flight entertainment typically only found in wide-body aircrafts while at the same time being economical and flexible enough to justify use on smaller aircraft.

SUMMARY OF THE INVENTION

The present invention relates to an in-flight entertainment system that includes several liquid crystal display (LCD) retract devices mountable in a passenger service unit of aircraft. Each of the LCD retract devices includes an input connector and an output connector arranged such that signals provided to the input connector appear at the output connector. A system control unit (SCU) is also provided. The SCU is configurable to provide video and power and control signals independently to the input connector of each of the LCD retract devices and is also configurable to provide video and power and control signals to the input connector of only a first of the LCD retract devices. In this latter configuration, the input and output connectors of successive LCD retract devices are connected in a daisy chain fashion such that the same signals are provided to each of the LCD retract devices. While the former configuration is particularly suited for wide-body aircraft, the latter configuration is particularly suited for narrow-body aircraft. This type of flexibility has not heretofore been provided in the prior art.

An additional feature of the input and output connectors is that while the input connector has exposed conductor contacts (a standard of this industry), the output connector has non-exposed conductor contacts. This provides two safety functions; the first is to preclude attachment of the wrong cable to the output connector, and the second is to protect an operator by preventing him or her from touching the contacts within the output connector when the input connector cable is attached and power is present to both connectors.

In another aspect of the present invention, each of the plurality of LCD retract devices includes status communications bus electronics such as RS-485. By incorporating the status communication bus electronics in the LCD retract device, SVDU's are eliminated. As such, the wall panels of the aircraft need not be removed in order to install or service the status communications bus electronics.

BRIEF DESCRIPTION OF THE DRAWINGS

FIG. 3 is a front view of a connector module in accord with the present invention.

FIG. 4 is a side view of the connector module of FIG. 3.

FIG. 6 is a first arrangement of the LCD retract devices in accord with an aspect of the present invention.

FIG. 7 is a second arrangement of the LCD retract devices in accord with an aspect of the present invention.

DETAILED DESCRIPTION OF THE INVENTION

Figure 1:
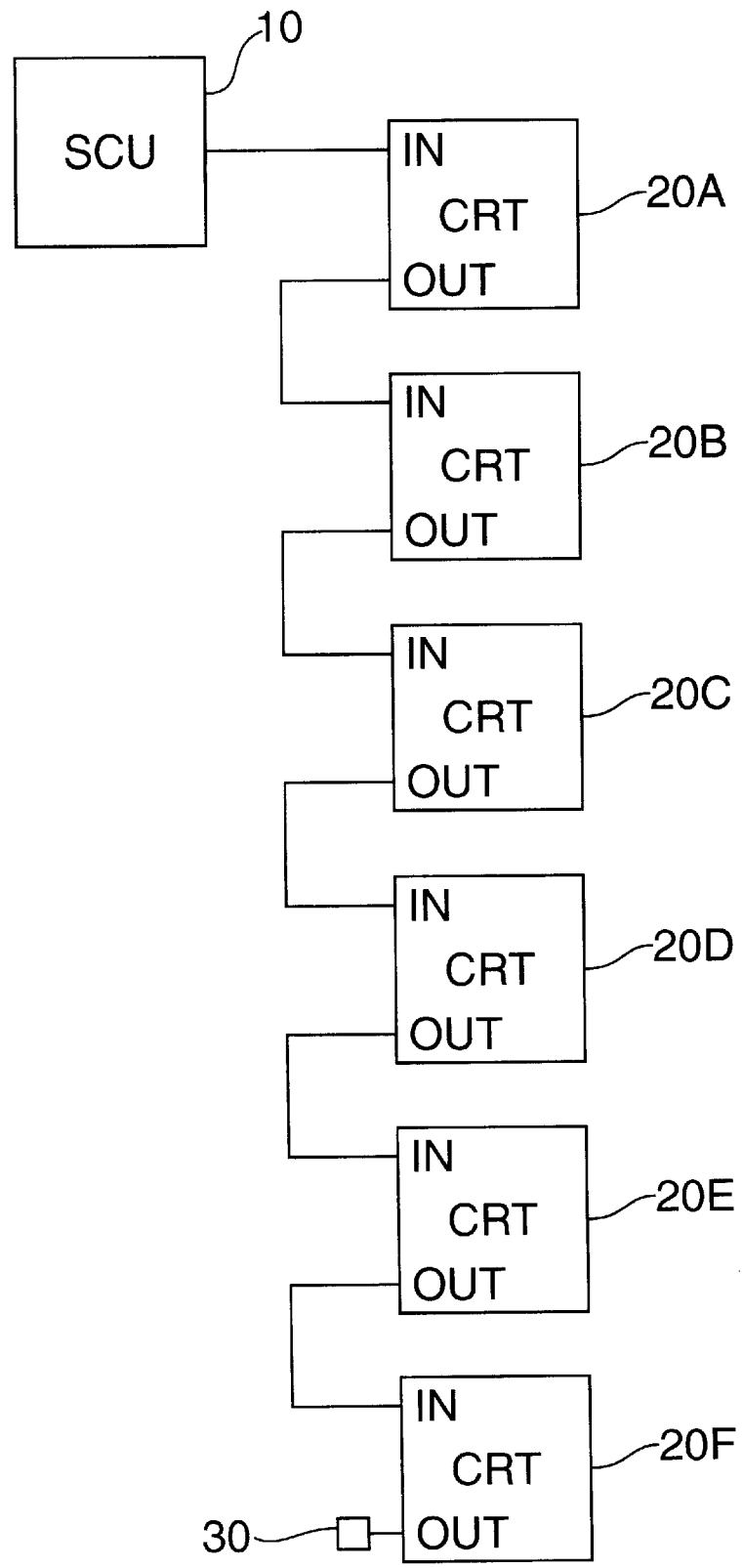
FIG. 1 is a view of a conventional in-flight entertainment system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiment shown and described. In the description below, like reference numerals are used to describe the same, similar or corresponding parts in the several views of the drawings.

Figure 5:
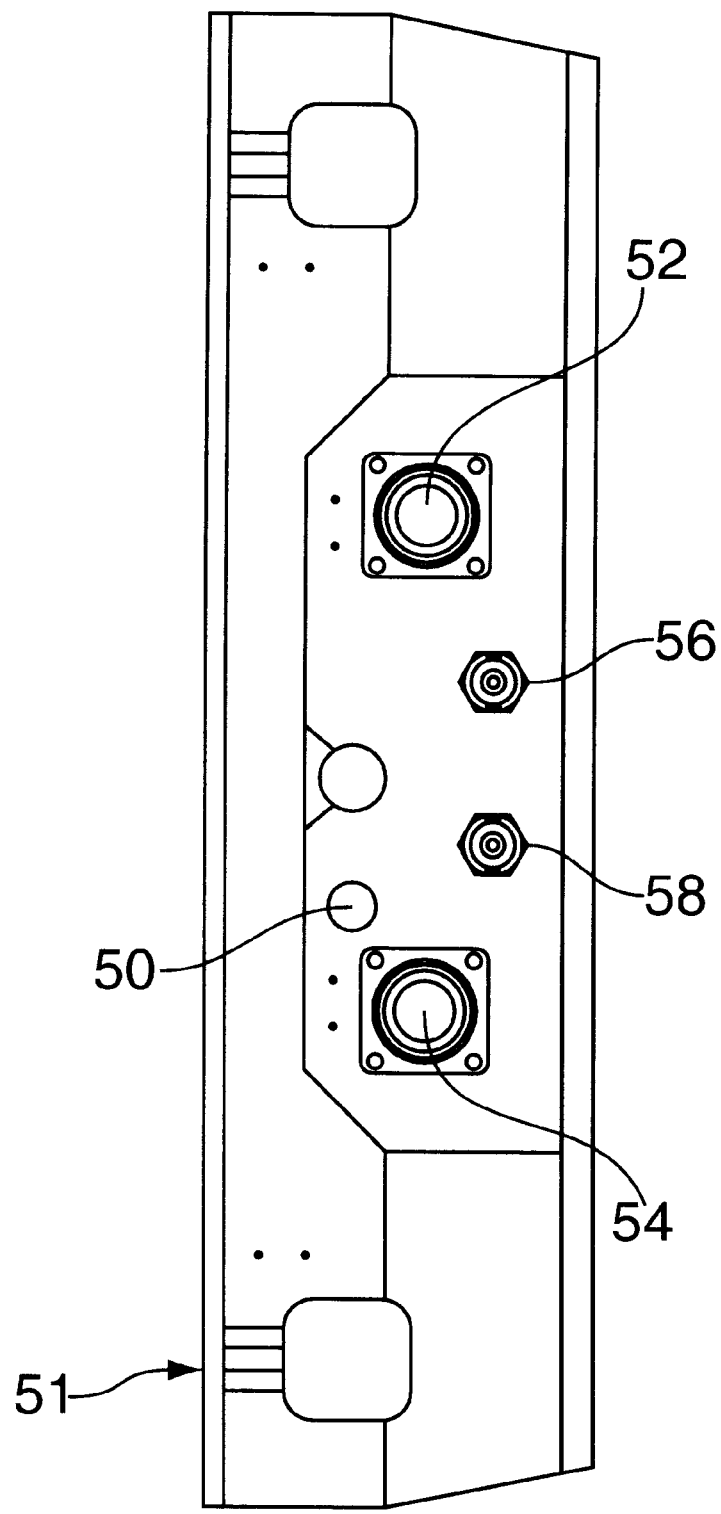
FIG. 5 is a top view of an LCD retract device including a connector module.

Many aircraft include entertainment systems which serve to entertain passengers during the course of an airline flight. Such systems include viewing elements such as monitors for displaying motion pictures and other programming. Each of the monitors include a connector arrangement for enabling monitors to receive information. U.S. Pat. No. 5,096,271, the disclosure of which is expressly incorporated herein by reference, describes a retractable liquid crystal display (LCD) device mountable in the passenger service unit of an aircraft. Referring to the drawings more particularly by reference numbers, FIGS. 3 and 4 show a connector module 50 in accord with an aspect of the present invention, and FIG. 5 shows the connector module 50 incorporated into an LCD retract device 51 of the type described above. The module 50 includes power and control input 52 and output 54 connectors and video input 56 and output connectors 58. Power and control signals provided at the control input connector 52 are utilized by the LCD retract device 51 and also provided at the control output connector 54. Similarly, video signals provided at the video input connector 56 are utilized by the LCD retract device 51 and also provided at the video output connector 58.

FIGS. 6 and 7 show alternative configurations of a plurality of LCD retract devices 51A–F. The flexibility to take on multiple configurations was not heretofore provided in the prior art with respect to LCD retract devices and represents an inventive aspect of the present invention. Preferably, the LCD retract devices 51A–F of FIGS. 6 and 7 are of the type described below with respect to FIG. 8, wherein communications bus electronics is incorporated directly into the LCD retracts. It should be noted that the configuration in FIGS. 6 and 7 could represent all of the monitors in an entire aircraft or only those in a given zone. Each of the LCD retract devices 51A–F further includes a connector module 50A–F, respectively, of the type described with respect to FIGS. 3 and 4. The connector modules 50A–F in turn each include power and control input 52A–F and output 54A–F connectors and video input 56A–F and output 58A–F connectors. For purposes of simplicity, only one input and one output from each of the connector modules 50A–F of LCD retract devices 51A–F is shown. It will be understood, however, that each of these individual inputs and outputs represents both the power and control and video inputs and outputs of a given LCD retract device.

A system control unit (SCU) 10 provides both power and control and video output signals. The video signals are typically received by the SCU 10 from a VCR (not shown) and routed by the SCU 10 to the LCD retract devices. The SCU 10 is essentially a microcontroller for generating control signals and switching video signals in response to a stored program and user inputs. The SCU 10 also tracks the status of the various LCD retract devices 51A–F. The SCU 10 of the present invention preferably generates control signals in the form of RS-485 protocol, although other suitable protocols will be well within the purview of one of ordinary skill in the art. A suitable SCU is model number 743-0315-001 programmable SCU manufactured by Sony Transcom, Inc. of Irvine, Calif.

More particularly, FIG. 6 shows the plurality of LCD retract devices 51A–F arranged in a daisy chain fashion wherein the SCU 10 provides video and power and control signals to the input connector 52A, 56A of only the first LCD retract device 51A. None of the other LCD retract devices 51B–F receive signals directly form the SCU 10. Rather, LCD 51B receives the video and power and control signals via the output connector 54A, 58A of LCD retract device 51A, which is connected to the input connector 52B, 56B of LCD retract device 51B. This same connection arrangement continues until the last LCD retract device 51F is reached. The output connector 54F, 58F of the last LCD retract device 51F is terminated by a terminator 30 for purposes of impedance matching. As a result of this daisy chain connection arrangement, each of the LCD retract devices 51A–F receives the same video and power and control signals from the system control unit 10. An arrangement of the type shown in FIG. 6 would be appropriate for a narrow-body aircraft where minimizing costs is an overriding concern. Heretofore it was not feasible to bring this sophisticated type of in-flight entertainment including LCD retract devices to narrow-body aircraft in a cost efficient manner.

Turning now to FIG. 7, this figure shows an alternative configuration of the LCD retract devices 51A–F of FIG. 6. Again, this flexibility to take on alternative configurations was not heretofore provided in the art. In this configuration, each of the LCD retract devices 51A–F is directly connected to the system control unit 10 and the system control unit 10 is adapted to provide each of the LCD retract devices 51A–F with independent video and power and control signals.

Specifically, each of the LCD retract devices 51A–F of FIG. 7 is supplied at its input connector 52A, 56A–52F, 56F, respectively, with video and power and control signals from the system control unit 10. The system control unit 10 is the same as that described above with respect to FIG. 6. Each of the output connectors are in turn terminated by a terminator 30 for purposes of impedance matching. This is a far more sophisticated arrangement than that described in connection with FIG. 6 as it results in each of the LCD retract devices 51A–F being able to receive independent video and power and control signals, for example. Such an arrangement is, of course, more expensive and would therefore be more suitable on wide-body aircraft.

It is important to note that the same LCD retract devices 51A–F are used in the configurations of both FIGS. 6 and 7. This flexibility had not heretofore been achieved with LCD retract devices. As a result, it is now possible to bring more sophisticated entertainment systems typically found only in wide-body aircraft to narrow-body aircraft as a way to generate additional revenue for the airlines while at the same time maintaining versatility of the simpler systems traditionally found in narrow-body aircraft.

Figure 2:
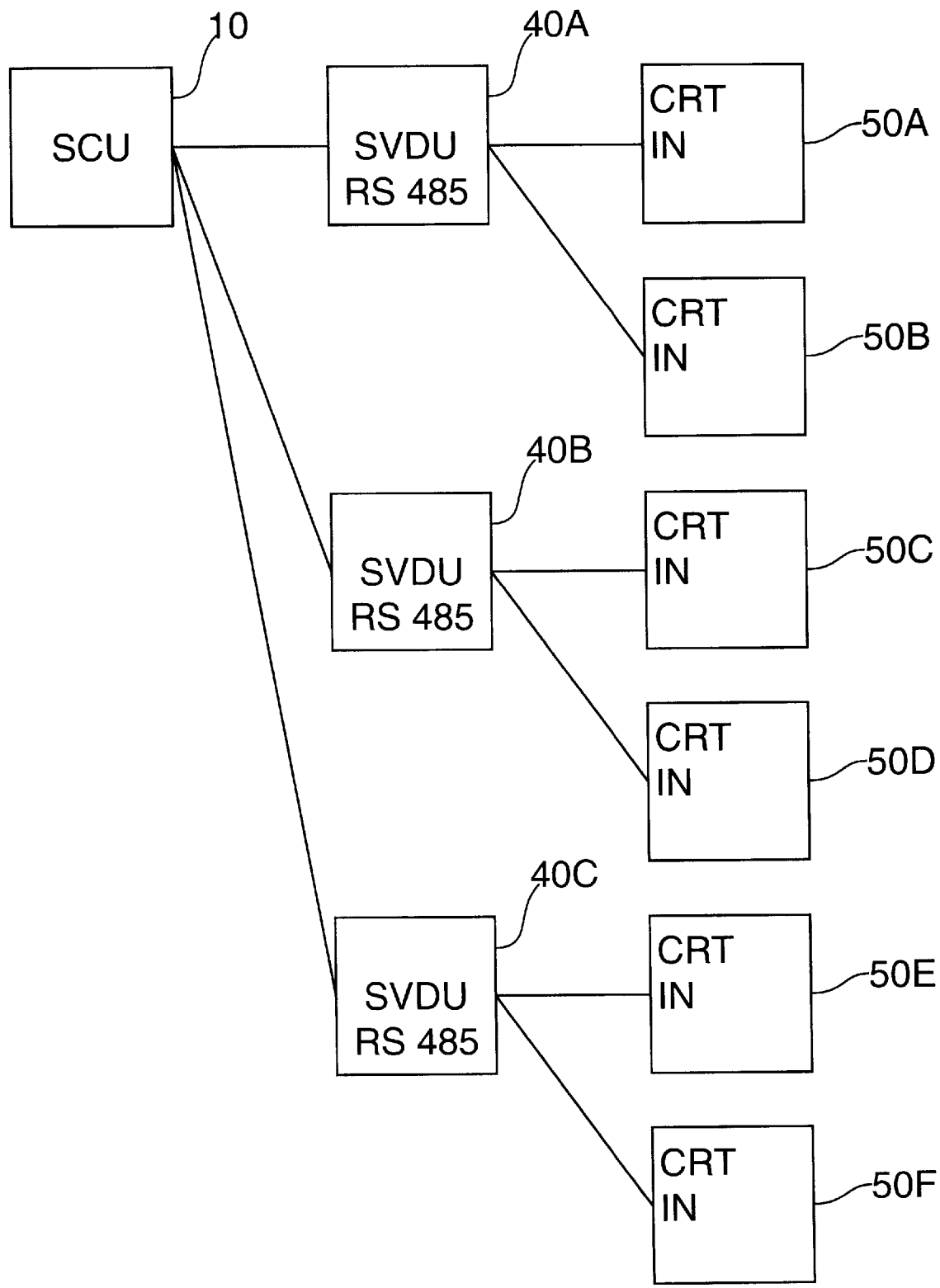
FIG. 2 is a view of a second conventional in-flight entertainment system.
Figure 8:
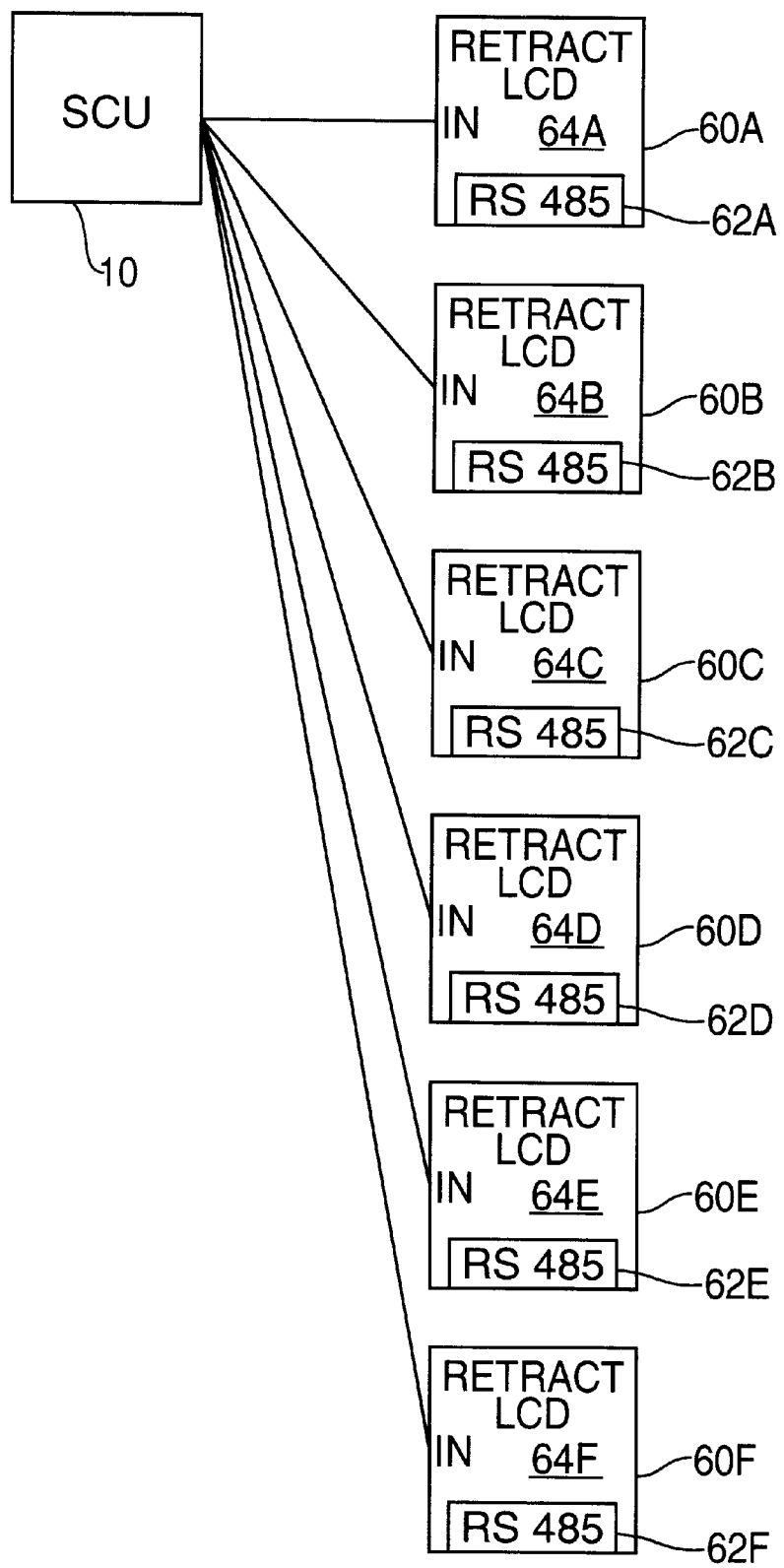
FIG. 8 is an arrangement of LCD retract devices with communication status bus electronics in accord with another aspect of the present invention.

FIG. 8 shows yet another aspect of the present invention. In this embodiment, the communication bus electronics, e.g., RS-485, included in the prior art SVDU's of FIG. 2, has been moved to the LCD retract devices 60A–E. Preferably, LCD retreat devices 60A–E can be used in the alternative configurations described in FIGS. 6 and 7. As noted above, SVDUs are mounted between the wall panel and the fuselage of an aircraft. As such, the wall panels of the aircraft must be removed in order to install or service the SVDU's. This is a relatively time consuming process and it would be desirable to carry-out such operations without removing aircraft wall panels. By moving the communications bus electronics to the LCD retract devices, which are mounted in the passenger service unit, access to the communications status bus electronic can be easily gained. FIG. 8 shows that each of the LCD retract devices 60A–F includes a respective RS-485 communications electronic box 62A–F. The communication boxes 62A–F receive control signals from the SCU 10 via respective input connectors 64A–F. The communication boxes 62A–F interpret these signals and control their respective LCD retract devices 60A–F in response thereto. The communication boxes 62A–F are also arranged to report the status of their respective LCD retract devices to the SCU 10. As noted above, the LCD retract devices 60A–F with communication boxes 62A–F can be used with either of the arrangements of FIGS. 6 and 7 by providing output connectors in conventional fashion.

The communication boxes 62A–F include well known components such as an RS-485 transceiver chip, a microprocessor chip, a UART chip, a latch chip as well as RS-485 protocol software. Furthermore, the physical incorporation of the communication boxes 62A–F into the LCD retract devices 60A–F is well within the purview of one of ordinary skill in the art. Thus, it is apparent that in accordance with the present invention, an apparatus that fully satisfies the objectives, aims and advantages is set forth above. While the invention has been described in conjunction with the specific embodiments, it is evident that many alternatives, modifications, permutations and variations will become apparent to those skilled in the art in light of the forgoing description. Accordingly, it is intended that the present invention embrace all such alternatives, modifications and variations as fall within the scope of the appended claims.

We claim:

1. An in-flight entertainment system comprising:

a plurality of liquid crystal display (LCD) retract units mountable in a passenger service unit of aircraft, each of said plurality of LCD retract units including an input connector and an output connector, signals provided to said input connector appearing at said output connector;

a system control unit first configurable to provide video, power and control signals independently to said input connector of each of said plurality of LCD retract units and second configurable to provide video, power and control signals to said input connector of only a first of said plurality of LCD retract units wherein said input and output connectors of successive LCD retract units are connected in a daisy chain fashion in said second configuration.

2. The in-flight entertainment system of claim 1 wherein each of said plurality of LCD retract units includes status communications bus electronics.

3. The in-flight entertainment system of claim 2 wherein said status communications bus electronics is of an RS-485 protocol.

4. The in-flight entertainment system of claim 1 wherein said output connector has non-exposed conductor contacts.

5. An aircraft entertainment system comprising:

a plurality of liquid crystal display (LCD) devices retractably mountable in a passenger service unit of an aircraft, each of said plurality of LCD devices including at least a control input connector, a control output connector, a video input connector and a video output connector, signals provided to said control input connector appearing at said control output connector and signals provided to said video input connector appearing at said video output connector; and a central control unit arranged to provide at least a control and a video signal, said plurality of LCD devices and said central control unit first configurable such that said central control unit applies said control signal only to said control input connector of a first of said plurality of LCD devices and applies said video signal only to said video input connector of said first of said plurality of LCD devices, successive ones of said plurality of LCD devices having said video input connector connected to said video output connector of previous ones of said plurality of LCD devices and having said control input connector connected to said control output connector of previous ones of said plurality of LCD devices, and said plurality of LCD devices and said central control unit second configurable such that said central control unit independently applies said control and said video signal directly to said control input connector and said video input connector, respectively, of each of said plurality of LCD devices.

* * * * *